(12) United States Patent (10) Patent No.: US 12,681,701 B2
Komatsubara (45) Date of Patent: Jul. 14, 2026

(54) DRIVER GENERATION DEVICE AND DRIVER GENERATION METHOD

(71) Applicant: TOSHIBA TEC KABUSHIKI KAISHA, Tokyo (JP)

(72) Inventor: Yoshihiro Komatsubara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 237 days.

(21) Appl. No.: 18/642,378

(22) Filed: Apr. 22, 2024

(65) Prior Publication Data

US 2024/0354076 A1 Oct. 24, 2024

(30) Foreign Application Priority Data

Apr. 24, 2023 (JP) ................................. 2023-071140

(51) Int. Cl.
*G06F 9/45* (2006.01)
*G06F 8/41* (2018.01)
*G06F 9/455* (2018.01)
(52) U.S. Cl.
CPC ............ *G06F 8/41* (2013.01); *G06F 9/45558* (2013.01)
(58) Field of Classification Search
CPC ........................................................ G06F 8/41
USPC ........................................................ 717/140
See application file for complete search history.

(56) References Cited

U.S. PATENT DOCUMENTS

| | | | | |
|---|---|---|---|---|
| 10,909,165 | B2 * | 2/2021 | Eder | G06F 16/51 |
| 11,132,450 | B2 * | 9/2021 | Goyal | G06F 16/188 |
| 11,385,923 | B2 | 7/2022 | Sekman et al. | |
| 11,625,360 | B2 * | 4/2023 | De Lima, Jr. | G06F 12/0875 |
| | | | | 707/649 |
| 2021/0019169 | A1 * | 1/2021 | Sekman | G06F 9/45558 |
| 2023/0021416 | A1 | 1/2023 | Frackiewicz | |
| 2024/0345865 | A1 * | 10/2024 | Kumar | H04L 67/10 |
| 2024/0354076 | A1 * | 10/2024 | Komatsubara | G06F 9/45558 |

FOREIGN PATENT DOCUMENTS

JP 2022-540810 A 9/2022

OTHER PUBLICATIONS

Notice of Reasons for Refusal dated Jan. 27, 2026 issued in JP Application No. 2023-071140, with English translation, 8 pages.

\* cited by examiner

*Primary Examiner* — Evral E Bodden
(74) *Attorney, Agent, or Firm* — FOLEY & LARDNER LLP

(57) ABSTRACT
A driver generation device includes a processor and a memory. The memory stores kernel source code for an embedded device with Linux installed, driver source code for a device driver for the embedded device, a container including a cross compiler that compiles the driver source, and container virtualization software that manages the container. The memory is configured to store a driver generation program, when executed by the processor, causes the computer to (a) mount the kernel source code from the computer to a first directory within the container, the first directory having the same path as a second directory on the computer containing the kernel source code, (b) mount the driver source code within the container, and (c) compile the driver source code to generate the device driver.

17 Claims, 3 Drawing Sheets

DRIVER GENERATION DEVICE AND DRIVER GENERATION METHOD

CROSS-REFERENCE TO RELATED APPLICATION

This application is based upon and claims the benefit of priority from Japanese Patent Application No. 2023-071140, filed on Apr. 24, 2023, the entire contents of which are incorporated herein by reference.

FIELD

Embodiments described herein relate generally to a driver generation device and a driver generation method.

BACKGROUND

A technology that uses a container technology to prepare a container with an environment for compiling a driver source of a device driver, mount the driver source within the container, and compile the driver source within the container is known.

DETAILED DESCRIPTION

A kernel source and path information of the kernel source are required for compiling the driver source. For this reason, when building the device driver using the kernel source (for a point of sale (POS), multi-function peripheral (MFP) such as a printer/scanner, and the like) on a host personal computer (PC) with existing technology, the kernel source is required to be mounted on the container along with the driver source. Here, the host PC is a physical computer that executes container virtualization software. In this case, the path information of the kernel source changes between the host PC and the container. Therefore, on the container, a compile command used during compilation on the host PC should be changed.

Embodiments provide a driver generation device capable of compiling a driver source within a container using a compile command used during compilation on a computer.

In general, according to one embodiment, there is provided a driver generation device that includes a computer including a processor and a storage device. The storage device stores a kernel source for an embedded device with Linux (registered trademark) installed, a driver source for a device driver for the embedded device, a container including a cross compiler that compiles the driver source, and container virtualization software that manages the container. The storage device stores a driver generation program that causes the processor to implement a function of referring to path information of the kernel source on the computer during starting of the container by the container virtualization software, a function of creating a directory with the same path as a directory of a path of the kernel source on the computer within the container based on the path information, a function of mounting the kernel source on the computer onto a directory with the same path within the container, a function of mounting the driver source into the container, and a function of compiling the driver source to generate a device driver using the same commands as on the computer.

Hereinafter, a driver generation device according to an embodiment will be described with reference to the drawings.

Hardware Configuration

Figure 1:
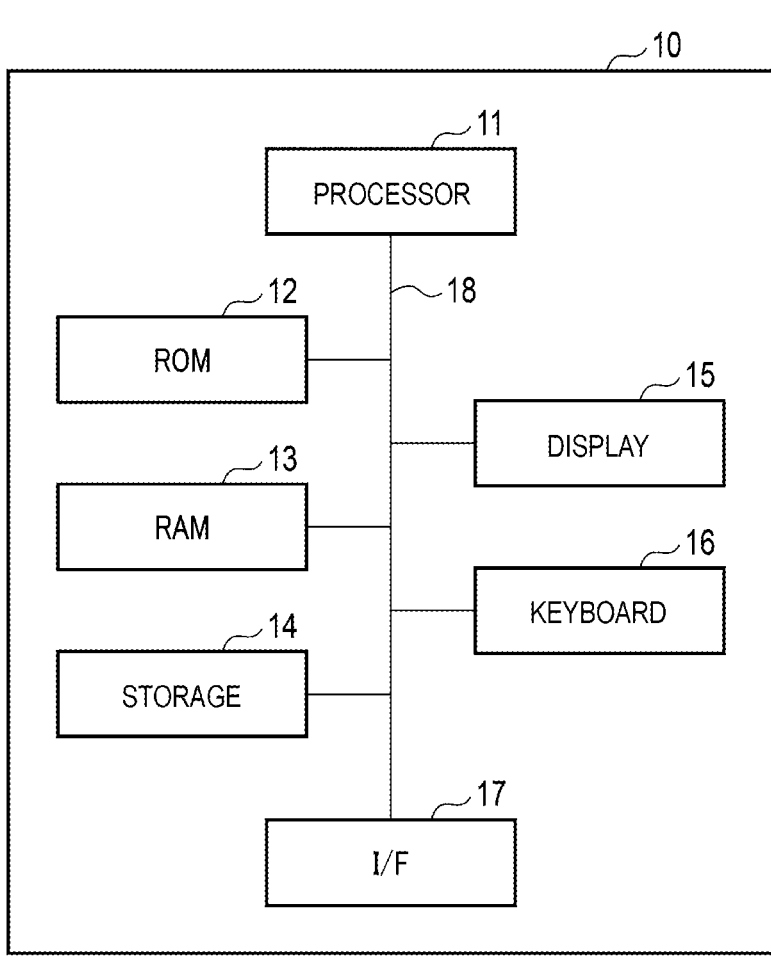
FIG. 1 is a diagram illustrating a hardware configuration of a driver generation device according to an embodiment.

First, with reference to FIG. 1, a hardware configuration of a driver generation device 10 according to an embodiment will be described. FIG. 1 is a diagram illustrating the hardware configuration of the driver generation device 10. The driver generation device 10 is configured with a computer.

As illustrated in FIG. 1, the driver generation device 10 includes a processor 11, a read only memory (ROM) 12, a random access memory (RAM) 13, a storage 14, a display 15, a keyboard 16 (e.g., the display 15 and the keyboard 16 forming a user interface), and an interface (I/F) 17. In addition to these components, the driver generation device 10 may include other peripheral devices.

The processor 11, the ROM 12, the RAM 13, the storage 14, the display 15, the keyboard 16, and the interface 17 are electrically connected to each other via a bus 18, and transmit and receive data to and from each other via the bus 18.

The processor 11 is hardware that executes a program and processes data (e.g., instructions stored in the storage 14). The processor 11 is configured with a general-purpose hardware processor including, for example, a central processing unit (CPU) and a graphical processing unit (GPU). The processor 11 controls the whole of the ROM 12, the RAM 13, the storage 14, the display 15, the keyboard 16, and the interface 17.

The ROM 12 and RAM 13 configure a main storage device (e.g., a memory). The ROM 12 is a non-volatile memory. The RAM 13 is volatile memory.

The ROM 12 stores a startup program required for starting the driver generation device 10. The processor 11 starts the driver generation device 10 by executing the startup program within the ROM 12. The ROM 12 is configured with, for example, an erasable programmable read only memory (EPROM), and stores various settings during startup in addition to the startup program.

The RAM 13 temporarily stores a program required for the processor 11 to perform various functions and data required for executing the programs.

The storage 14 is an auxiliary storage device that non-temporarily stores data. The storage 14 is configured with a non-volatile memory such as a hard disk drive (HDD) or a solid state drive (SSD). The storage 14 non-temporarily stores the program executed by the processor 11 and data required for executing the program. The processor 11 reads the program and data within the storage 14 into the RAM 13, and executes various functions by executing the program.

The display 15 is an output device that outputs data. The display 15 presents various information to the user.

The keyboard 16 is an input device that receives data. The keyboard 16 receives an instruction to be executed by the processor 11, data to be stored in the storage 14, and the like.

The interface 17 is connected to an external device and enables data input and output to and from the external device. The external device may include an input device such as a mouse and a receiving device, an output device such as a transmitting device, and an input/output device such as a disk drive.

Functional Configuration

Figure 2:
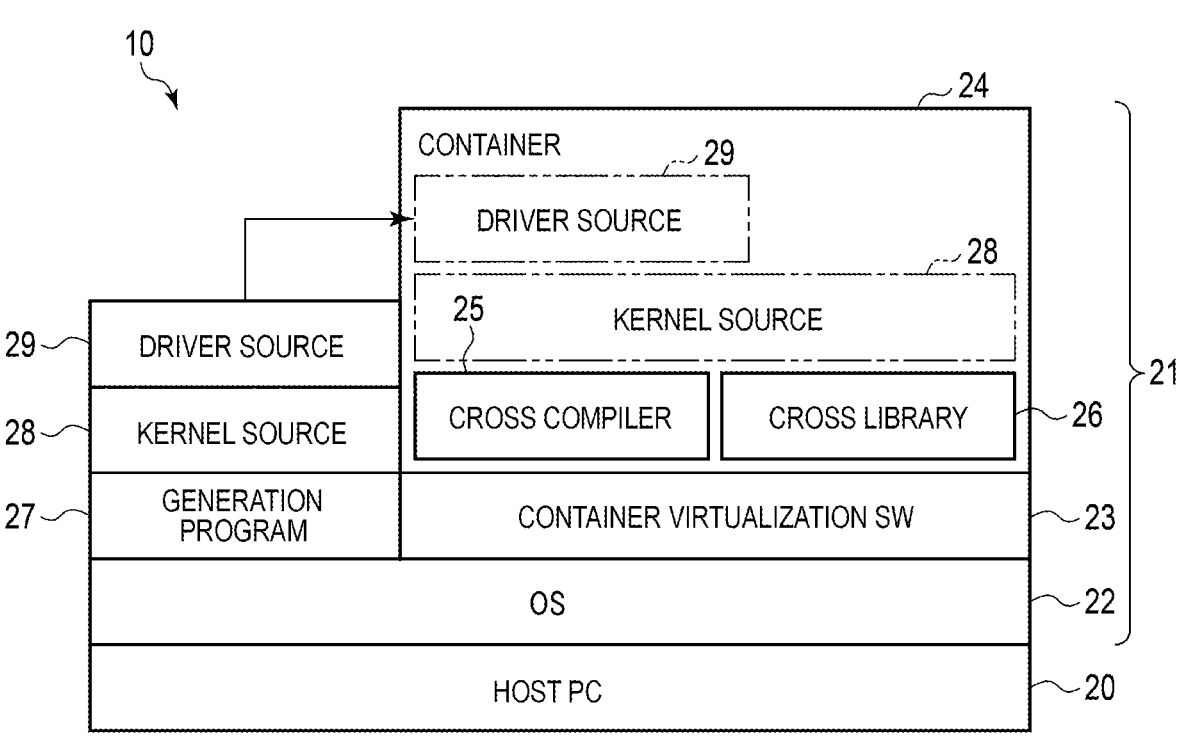
FIG. 2 is a diagram schematically illustrating a functional configuration of the driver generation device.

Next, with reference to FIG. 2, a functional configuration of the driver generation device 10 will be described. FIG. 2 is a diagram schematically illustrating the functional configuration of the driver generation device 10.

As illustrated in FIG. 2, the driver generation device 10 includes a host PC 20 and a software configuration 21 installed in the host PC 20. The software configuration 21 is stored in the storage 14, and is read into the RAM 13 during starting of the driver generation device 10.

The software configuration 21 includes an operating system (OS) 22, container virtualization software 23, a container 24, a driver generation program 27, a kernel source 28, and a driver source 29. The host PC 20 is a physical computer that executes the container virtualization software 23.

The container virtualization software 23 is a platform that realizes a container-type virtual environment. The container virtualization software 23 provides an execution environment for managing the container 24. Management of the container 24 includes starting the container 24, executing an application within the container 24, and stopping and removing the container 24.

The container 24 is formed by mounting a container image onto the container virtualization software 23. The container 24 provides an application execution environment independent of the platform. In the embodiment, the container 24 provides an application execution environment for compiling the driver source 29 for an embedded device with Linux installed. Embedded devices with Linux installed include, for example, a multi-function peripheral (MFP), a barcode printer (BCP), a point of sale (POS), a POS peripheral device, and the like.

The container 24 includes a cross compiler 25 and a cross library 26. The container 24 operates using a kernel of the OS 22. For example, the container virtualization software 23 is a Docker (registered trademark) engine, and the container 24 is a Docker container.

The driver generation program 27 is a program that controls the container virtualization software 23 so as to compile the driver source 29 within the container 24 and generate a device driver for the embedded device with Linux installed. In other words, the driver generation program 27 is a program that controls the container 24 through the container virtualization software 23.

The kernel source 28 is a kernel source code of the embedded device with Linux installed. For example, the kernel source 28 is stored in a directory of /src/kernel. The driver source 29 is a source code of the device driver for the embedded device with Linux installed. The driver source 29 is stored in the current directory.

Operation

Figure 3:
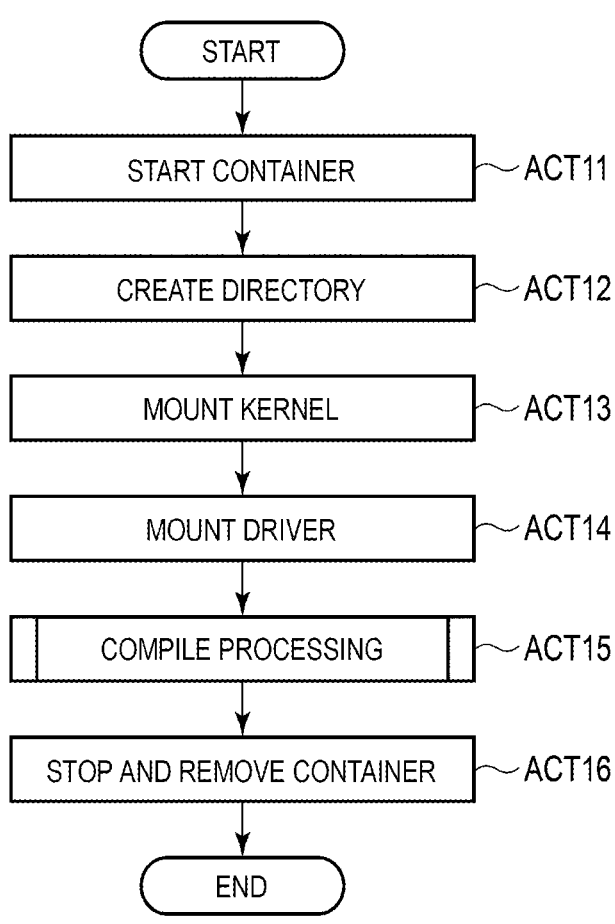
FIG. 3 is a flowchart illustrating a flow of processing of an operation of the driver generation device.
Figure 4:
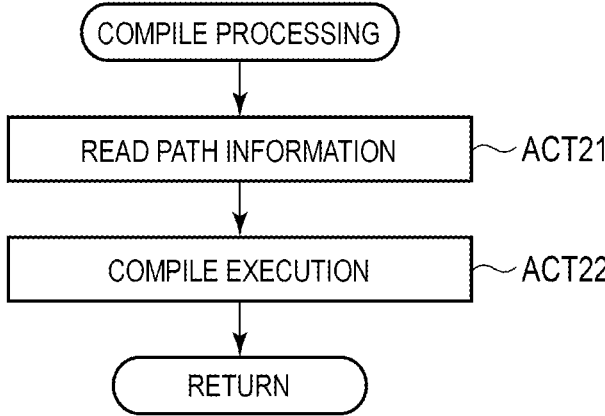
FIG. 4 is a flowchart illustrating a flow of compile processing within a container of the driver generation device.

An operation of the driver generation device 10 will be described below with reference to FIGS. 3 and 4. The operation of the driver generation device 10 is to compile the driver source 29 using the container technology and generate a device driver for the embedded device with Linux installed. FIG. 3 is a flowchart illustrating a flow of processing of the operation of the driver generation device 10. FIG. 4 is a flowchart illustrating a flow of compile processing within the container 24.

The operation of the driver generation device 10 is performed by the processor 11 executing the driver generation program 27 under the control of the OS 22 and by controlling the container virtualization software 23 according to the driver generation program 27. From another point of view, the operation of the driver generating device 10 is performed by the driver generating program 27 controlling the container 24 through the container virtualization software 23. In the following, for convenience, the driver generation program 27 and the container virtualization software 23 will be described as operating entities. The driver generation program 27 and the container virtualization software 23 are assumed to be started.

In ACT 11, the driver generation program 27 causes the container virtualization software 23 to start the container 24.

In ACT 12, the driver generation program 27 refers to path information of the kernel source 28 of the host PC 20, and delivers the path information to the container virtualization software 23. Subsequently, the driver generation program 27 causes the container virtualization software 23 to create a directory (/src/kernel) with the same path (/src/kernel) as a directory of a path of the kernel source 28 on the host PC 20 within the container 24 based on the path information. If the directory (/src/kernel) is already created, the container virtualization software 23 skips this processing.

In ACT 13, the driver generation program 27 causes the container virtualization software 23 to mount the kernel source 28 from the host PC 20 onto the directory (/src/kernel) within the container 24. For example, if the container virtualization software 23 is a Docker engine, the kernel source 28 is mounted on the Docker engine using a volume option of Docker by referring to an environment variable (KERNEL_SRC) used during building of a device driver on the host PC 20. As a result, the kernel source 28 is shared between the host PC 20 and the container 24.

In ACT 14, the driver generation program 27 causes the container virtualization software 23 to mount the driver source 29 from the host PC 20 into the container 24. For example, the driver generation program 27 causes the container virtualization software 23 to mount the driver source 29 located in the current directory onto a directory of/work in the container 24. As a result, the driver source 29 is shared between the host PC 20 and the container 24. Therefore, the processing for the driver source 29 within the container 24 is also reflected on the driver source 29 on the host PC 20.

In ACT 15, the driver generation program 27 causes the container virtualization software 23 to compile the driver source 29 within the container 24.

Here, the compile processing within the container 24 will be described with reference to FIG. 4.

In ACT 21, the container virtualization software 23 reads the path information of the kernel source 28 within the container 24. The path information of the kernel source 28 within the container 24 is the same as the path information of the kernel source 28 on the host PC 20, and each path information is (/src/kernel).

In ACT 22, the container virtualization software 23 causes the cross compiler 25 to compile the driver source 29 within the container 24. In this case, the path information of the kernel source 28 within the container 24 is the same as the path information of the kernel source 28 on the host PC 20, and thus the container virtualization software 23 can cause the cross compiler 25 to compile the driver source 29 within the container 24 using a compile command which is the same as the compile command used during compilation on the host PC 20. With this, a device driver is built within the container 24. As a result, the device driver is generated in the directory of/work within the container 24 and in the current directory on the host PC 20. With this configuration, the compile processing in the container 24 is completed. After generating the device driver, the container virtualization software 23 returns to processing at ACT 16 outside the container 24.

In ACT 16, the driver generation program 27 causes the container virtualization software 23 to stop and remove the container 24.

Through the process described above, the operation of the driver generation device 10, that is, the process of compiling the driver source 29 using the container 24 and generating the device driver for the embedded device with Linux installed is completed.

Driver Generation Program

As can be seen from the above description, the driver generation program 27 causes the host PC 20 to implement a function of referring to the path information of the kernel source 28 on the host PC 20 during starting of the container 24 by the container virtualization software 23, a function of creating a directory with the same path as a directory of a path of the kernel source 28 on the host PC 20 within the container 24 based on the path information, a function of mounting the kernel source 28 on the host PC 20 onto the directory with the same path within the container, a function of mounting the driver source 29 within the container 24, and a function of compiling the driver source 29 to generate the device driver using the same commands as on the host PC 20.

From another point of view, the driver generation program 27 refers to the path information of the kernel source 28 on the host PC 20 during starting of the container 24 by the container virtualization software 23, then causes the container virtualization software 23 to create a directory in the container 24 with the same path as a directory of a path of the kernel source 28 on the host PC 20 based on the path information, then causes the container virtualization software 23 to mount the kernel source 28 on the host PC 20 to the directory with the same path within the container 24, then causes the container virtualization software 23 to mount the driver source 29 within the container 24, and then causes the container virtualization software 23 to allow the cross compiler 25 to compile the driver source 29 to generate a device driver using the same commands as on the host PC 20.

Effect

As can be seen from the above description, according to the embodiment, the kernel source 28 on the host PC 20 is mounted onto a directory within the container 24 with the same path as the directory of the path of the kernel source 28 on the host PC 20. Therefore, the driver source 29 can be compiled within the container 24 using the compile command used during compilation on the host PC 20. That is, a path environment variable of the kernel source 28 required when building a device driver on the host PC 20 can be used within the container 24 without changing the path environment variable. Therefore, a build script for the host PC 20 can be used to compile the driver source 29 within the container 24. With this, a user can build the device driver without being aware of a directory structure within the container 24.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A driver generation device comprising:
   a computer including:
      a processor; and
      a memory configured to store:
         kernel source code for an embedded device with Linux installed;
         driver source code for a device driver for the embedded device;
         a container including a cross compiler that compiles the driver source code; and
         container virtualization software that manages the container,
   wherein the memory is configured to store a driver generation program that, when executed by the processor, causes the computer to:
      mount the kernel source code from the computer to a first directory within the container, the first directory having the same path as a second directory on the computer containing the kernel source code;
      mount the driver source code within the container; and
      compile the driver source code to generate the device driver.

2. The driver generation device of claim 1, wherein the driver generation program causes the computer to:
   compile the driver source code to generate the device driver within the container based on the path of the first directory.

3. The driver generation device of claim 1, wherein the driver generation program causes the computer to:
   compile the driver source code to generate the device driver on the computer using a set of commands; and
   compile the driver source code to generate the device driver within the container using the same set of commands.

4. The driver generation device of claim 1, wherein the driver generation program causes the computer to:
   refer to path information of the kernel source code on the computer while the container virtualization software starts the container; and
   create the first directory within the container based on the path information.

5. The driver generation device of claim 4, wherein the driver generation program causes the computer to:
   control the container virtualization software to create the first directory within the container based on the path information;
   control the container virtualization software to mount the kernel source code from the computer to the first directory within the container;
   control the container virtualization software to mount the driver source code within the container; and
   control the container virtualization software to compile the driver source code to generate the device driver.

6. The driver generation device of claim 1, wherein the driver generation program causes the computer to:
   control the container virtualization software to mount the kernel source code from the computer to the first directory within the container;
   control the container virtualization software to mount the driver source code within the container; and control the container virtualization software to compile the driver source code to generate the device driver within the container.

7. The driver generation device of claim 1, wherein the embedded device includes at least one of a multi-function peripheral, a barcode printer, a point of sale (POS), or a POS peripheral.

8. The driver generation device of claim 1, wherein the container virtualization software is a Docker engine.

9. A driver generation method comprising:

causing a computer to perform a set of operations, the computer including a processor and a memory configured to store:

kernel source code for an embedded device with Linux installed;

driver source code for a device driver for the embedded device;

a container including a cross compiler that compiles the driver source code; and container virtualization software that manages the container, the set of operations including:

mounting the kernel source code from the computer to a first directory within the container, the first directory having the same path as a second directory on the computer containing the kernel source code;

mounting the driver source code within the container; and compiling the driver source code to generate the device driver.

10. The driver generation method of claim 9, wherein the set of operations includes:

referring to path information of the kernel source code on the computer while the container virtualization software starts the container; and creating the first directory within the container based on the path information.

11. The driver generation method of claim 10, wherein the set of operations includes:

compiling the driver source code to generate the device driver on the computer using a set of commands; and compiling the driver source code to generate the device driver within the container using the same set of commands.

12. The driver generation method of claim 11, wherein the set of operations includes:

compiling the driver source code to generate the device driver within the container based on the path of the first directory using the same set of commands.

13. The driver generation method of claim 9, wherein the embedded device includes at least one of a multi-function peripheral, a barcode printer, a point of sale (POS), or a POS peripheral.

14. The driver generation method of claim 9, wherein the container virtualization software is a Docker engine.

15. A driver generation method comprising:

causing a computer to perform a set of operations, the computer including:

a kernel source for an embedded device with Linux installed;

a driver source for a device driver for the embedded device;

a container including a cross compiler that compiles the driver source;

container virtualization software that manages the container; and a driver generation program that controls the container virtualization software, the set of operations including:

referring to path information of the kernel source on the computer while the container virtualization software starts the container;

allowing the container virtualization software to create a first directory within the container based on the path information, the first directory having the same path as a second directory of the computer containing the kernel source;

allowing the container virtualization software to mount the kernel source within the container;

allowing the container virtualization software to mount the driver source within the container; and allowing the container virtualization software to operate such that the cross compiler compiles the driver source to generate the device driver using a set of commands that is also used to generate the device driver on the computer.

16. The driver generation method of claim 15, wherein the embedded device includes at least one of a multi-function peripheral, a barcode printer, a point of sale (POS), or a POS peripheral.

17. The driver generation method of claim 15, wherein the container virtualization software is a Docker engine.

* * * * *